United States Patent [19]

Leunig

[11] 4,122,707
[45] Oct. 31, 1978

[54] FLOW TEST STAND

[75] Inventor: Ernst Leunig, Wolfsburg, Fed. Rep. of Germany

[73] Assignee: Volkswagenwerk Aktiengesellschaft, Fed. Rep. of Germany

[21] Appl. No.: 807,565

[22] Filed: Jun. 17, 1977

[30] Foreign Application Priority Data

Jul. 7, 1976 [DE] Fed. Rep. of Germany ....... 2630521

[51] Int. Cl.² ........................................... G01M 15/00
[52] U.S. Cl. ................................................. 73/118 R
[58] Field of Search ............................. 73/118, 3, 49.7

[56] References Cited

U.S. PATENT DOCUMENTS

| 2,597,231 | 5/1952 | Edelen | 73/118 |
| 3,604,254 | 9/1971 | Sabuda | 73/118 |

Primary Examiner—Jerry W. Myracle
Attorney, Agent, or Firm—Brumbaugh, Graves, Donohue & Raymond

[57] ABSTRACT

A fluid flow test stand for measuring the flow cross-section of a specimen, such as an automotive carburetor, is provided with a test nozzle arranged at a fluid flow outlet of the specimen. The test nozzle has characteristic quantities of inlet pressure and flow volume. In accordance with the invention, control means are provided for varying either the inlet pressure or flow volume of the test nozzle independent of the outlet pressure and flow volume through the specimen.

6 Claims, 3 Drawing Figures

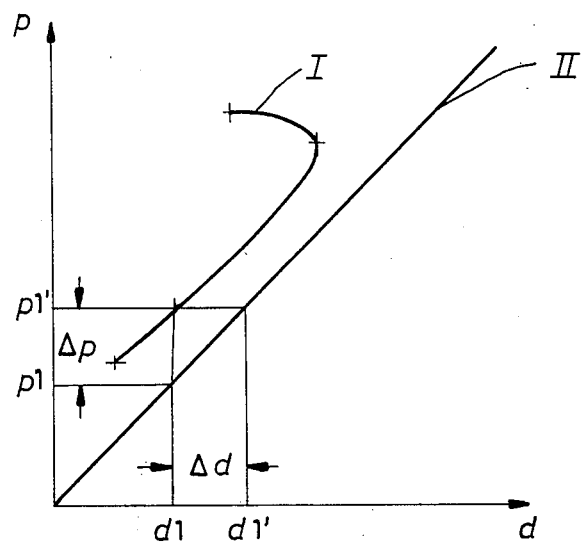
Fig. 1
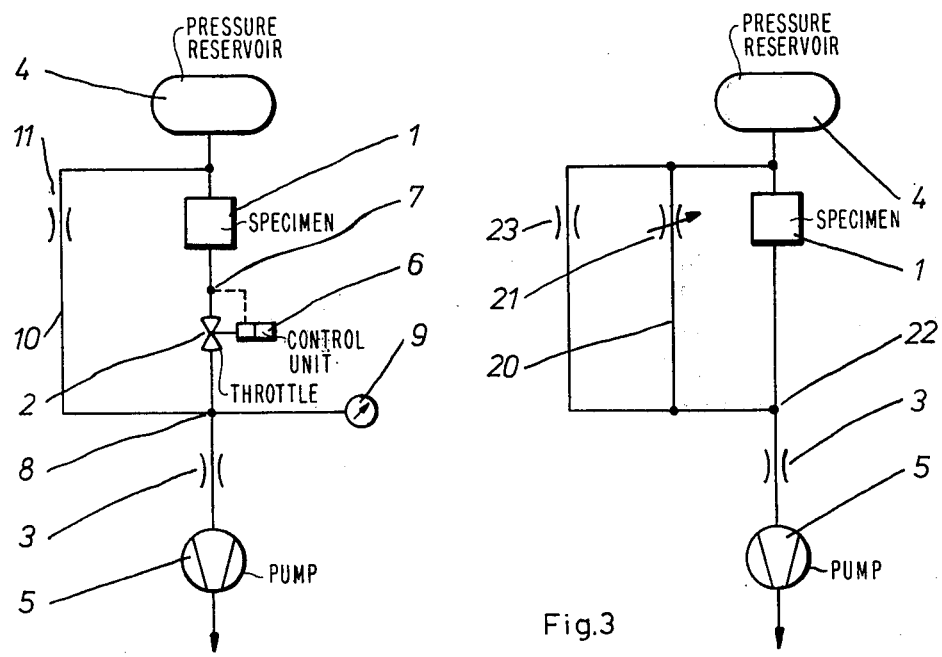
Fig. 2
Fig. 3

FLOW TEST STAND

BACKGROUND OF THE INVENTION

This invention relates to test stands for measuring and adjusting fluid flow devices. In particular, this invention relates to such test stands which use calibrated test nozzles for determining the fluid flow characteristics of a specimen, such as a carburetor.

Prior U.S. Pat. Nos. 3,520,312 and 3,528,080 disclose a method and apparatus for testing the flow characteristics of a test specimen, such as a carburetor. In accordance with the disclosure of those patents, air is drawn through the test specimen by an exhaust pump from a temperature and pressure controlled enclosure. The test stand is provided with a number of sonic outlet nozzles. While the drawings of the prior patent show two outlet nozzles, the specification indicates that a larger number of such nozzles are required in order to adequately test the operation of various carburetors under various operating conditions. Extensive testing of air and fuel flow through a carburetor is required to assure that the carburetor will function properly and provide a suitable fuel-air mixture, so that the associated engine will operate in compliance with emission control standards. A similar test stand can be used for testing fluid flow characteristics of specimens other than carburetors, such as thermostatically controlled venting devices.

A larger number of sonic outlet nozzles are required for adequate testing of various specimens because the outlet pressure of the device must be matched to the inlet pressure of the test nozzle with the identical volume of fluid flow through the specimen and the test nozzle. Accordingly, prior art devices made use of different aperture size nozzles, used alone or in combination, to adjust the fluid flow volume through the test stand and thereby match the pressure and flow volume characteristics of the test nozzles and the specimen.

In accordance with the prior art, the test specimen is supplied with air, or other fluid, at a selected temperature and pressure. The outlet of the test specimen is connected to an intermediate chamber which has an outlet through a test nozzle. The test nozzle outlet opens into a chamber which is evacuated to less than half the pressure in the intermediate chamber so that the flow through the test nozzle is at sonic velocity, and therefore dependent only on the pressure in the intermediate chamber. Since the specimen and test nozzle are in series flow configuration, the flow volume through the specimen is equal to the flow volume through the test nozzle. This flow volume can be determined directly from the intermediate chamber pressure, since the outlet test nozzle is in a sonic or critical flow condition. A proper measurement of the specimen flow characteristics is made when the intermediate chamber pressure, which is below the specimen inlet pressure, causes an equal flow volume through the test specimen and the test nozzle.

The pressure versus flow volume relations illustrated in FIG. 1 include that of a carburetor, curve I, and that of a selected outlet test nozzle, curve II. For the characteristics illustrated, it is evident that the test nozzle does not have a pressure and flow volume condition which corresponds to one of the pressure and flow volume conditions of the particular specimen. Thus, at a constant flow condition $d1$ a pressure $p1'$ is required at the specimen outlet and a lower pressure $p1$ is required to maintain the flow through the outlet test nozzle. If a selected pressure $p1'$ exists in the intermediate chamber between the test specimen and the outlet nozzle, the flow rates through the two devices will correspond to $d1$ and $d1'$, which are unequal. It is therefore evident that the particular device represented by curve I cannot be properly tested using the outlet test nozzle represented by curve II. For this reason, the prior art device required the use of many outlet test nozzles, each with a different opening, and each having a different slope of pressure versus flow volume.

It is therefore an object of the present invention to provide a new and improved flow test stand wherein a single outlet test nozzle may be used for testing specimens having a variety of pressure and flow volume characteristics.

SUMMARY OF THE INVENTION

The invention is applicable to a flow test stand for measuring the flow cross-section of a specimen in which a fluid medium successively flows through the specimen and a test nozzle having a constant flow cross-section. The specimen has fluid characteristic quantities of outlet pressure and flow volume related by a first characteristic curve and the test nozzle has fluid characteristic quantities comprising inlet pressure and flow volume related by a second characteristic curve. In accordance with the invention, there are provided control means for varying the value of a selected one of the characteristic quantities for the test nozzle such that the value of the other one of said quantitites for the test nozzle is identical with the value of the corresponding quantity of the specimen.

In one embodiment the control means has a variable flow section and changes the inlet pressure of the test nozzle with respect to the outlet pressure of the specimen. In another embodiment, the control means is a variable flow section nozzle arranged in a fluid path bypassing the specimen and varying the flow volume through the test nozzle. The variable flow section bypassing nozzle may be provided with a minimum flow section to assure the maintenance of a critical flow through the test nozzle. Alternately, an additional fluid path may be provided bypassing the specimen and including a constant cross-section nozzle, which may correspond to a flow volume sufficient to ensure critical flow through the test nozzle even in the absence of substantial flow through the specimen.

For a better understanding of the present invention together with other and further objects, reference is made to the following description, taken in conjunction with the accompanying drawings, and its scope will be pointed out in the appended claims.

BRIEF DESCRIPTION OF THE DRAWINGS

FIG. 1 is a graph illustrating the pressure versus flow volume characteristics of a specimen and test nozzle.

FIG. 2 is a schematic representation of a flow test stand provided with a pressure regulating control in accordance with the present invention.

FIG. 3 is a schematic representation of a flow test stand having a flow volume regulating control in accordance with the present invention.

DESCRIPTION OF THE INVENTION

FIG. 2 illustrates a flow test stand in accordance with the invention. A test specimen 1 has an inlet connected to a pressure reservoir 4 and is connected in series flow configuration with an outlet test nozzle 3. An outlet pump 5 is provided to draw a suitable vacuum on the outlet side of test nozzle 3. The volume of fluid flow through test nozzle 3 is directly proportional to the pressure at the nozzle inlet 8, which can be determined by reference to pressure sensor 9. In order to provide suitable outlet pressure for specimen 1 corresponding to the flow volume through specimen 1 and nozzle 3, there is provided a variable flow section control 2 between specimen 1 and nozzle 3. Control 2 is operated by a control unit 6 which adjusts nozzle 2 to provide the desired outlet pressure at a point 7 corresponding to the outlet of specimen 1. Assuming, therefore, the absence of bypass channel 10, the flow through specimen 1 is equal in volume to the flow through test nozzle 3, but the pressure at the inlet 8 to test nozzle 3 may be different than the outlet pressure at point 7 which is applied to specimen 1 by an amount $\Delta p$ illustrated in FIG. 1. The flow volume may therefore be measured by reference to pressure sensing device 9. The pressure differential applied to specimen 1 is adjusted to a selected value by control 6 which adjusts variable section control element 2.

In the FIG. 2 device, a bypass flow channel 10 is provided in parallel to specimen 1. Flow channel 10 includes a critical flow nozzle 11 which regulates the volume of fluid flowing through channel 10. This flow is determined by the pressure in reservoir 4 which is constant. The flow through test nozzle 3 is the sum of the flow through nozzle 11 and through test specimen 1, and is determined by pressure sensor 9. The use of bypass channel 10 permits an accurate measurement to be made even when the flow volume through specimen 1 is very small, for example when specimen 10 is a control valve in a nearly closed position.

FIG. 3 is a schematic diagram of an alternate embodiment of the invention. The FIG. 3 embodiment includes a pressure reservoir 4, specimen 1, outlet test nozzle 3, and vacuum pump 5 which are the same as the corresponding components of the FIG. 2 apparatus. While the FIG. 2 apparatus has a different outlet pressure applied to specimen 1 than the inlet pressure of test nozzle 3, the FIG. 3 apparatus provides the same pressure to the specimen 1 and test nozzle 3 at point 22, but provides a variation in the flow volume through outlet test nozzle 3 by the use of an adjustable nozzle 21, which is arranged in a flow path 20 bypassing specimen 1. The device of FIG. 3 can therefore be adjusted in accordance with varying specimen conditions by changing the aperture of nozzle 21 and thereby varying the flow volume through test nozzle by an amount $\Delta d$, so that an equal pressure can be maintained at the outlet of specimen 1 and the inlet of test nozzle 3. The difference in flow volume provided by nozzle 21 is determined by nozzle calibrations. An additional fixed volume bypass nozzle 23 is also provided and operates similar to nozzle 11 of the FIG. 2 apparatus.

Those skilled in the art will recognize that it is possible to implement either the FIG. 2 of FIG. 3 embodiments without the use of the fixed aperture bypass nozzles 11 and 23. These are provided merely to maintain a critical flow through test nozzle 3 when the specimen to be measured has a relatively small flow section. It will also be recognized that fixed aperture nozzle 23 may be combined with variable aperture nozzle 21 by providing a single nozzle having a minimum area corresponding to the flow volume necessary to maintain nozzle 3 in a critical flow condition. It should be also noted that bypass nozzles 11 and 23 are useful when the specimen is a carburetor to dilute the fuel-air mixture supplied to outlet nozzle 3.

It will be seen that by providing control means to change either the pressure or the flow volume applied to the outlet test nozzle, measurements may be made under a variety of test conditions with the same test nozzle. In the case of a carburetor, these measurements may correspond to various throttle settings. In the case of a temperature regulated vent control, the various test conditions may correspond to the openings or closings of the control vent as heat is applied. In either case, the control devices provide a shift $\Delta p$ or $\Delta d$ in the calibration curve of the outlet test nozzle with respect to the characteristic curve of the specimen.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

I claim:

1. In a flow test stand for measuring the flow cross-section of a specimen wherein a fluid medium successively flows through the specimen and a test nozzle having a constant flow cross-section, said specimen having fluid characteristic quantities comprising outlet pressure and flow volume being related over a first characteristic curve, said test nozzle having fluid characteristic quantities comprising inlet pressure and flow volume being related over a second characteristic curve, the improvement wherein there is provided a variable flow section nozzle arranged in a fluid path bypassing said specimen for varying the flow volume through said test nozzle with respect to the flow volume through said specimen.

2. The improvement specified in claim 1 wherein said variable flow section nozzle has a minimum flow section area thereby to assure critical flow through said test nozzle.

3. The improvement specified in claim 1 wherein said variable flow section nozzle has dimensions assuring critical flow through said variable flow section nozzle.

4. In a flow test stand for measuring the flow cross-section of a specimen wherein a fluid medium successively flows through the specimen and a test nozzle having a constant flow cross-section, said specimen having fluid characteristic quantities comprising outlet pressure and flow volume being related over a first characteristic curve, said test nozzle having fluid characteristic quantities comprising inlet pressure and flow volume being related over a second characteristic curve, wherein control means are provided for varying the value of a selected one of said quantities for said test nozzle such that the value of the other one of said quantities for said test nozzle is identical with the value of the corresponding quantity of said specimen, the improvement wherein there is additionally provided a fluid path bypassing said specimen and including a constant cross-section nozzle, for assuring critical flow through said test nozzle.

5. The improvement as specified in claim 4 wherein said constant cross-section nozzle provides a flow volume sufficient to ensure critical flow through said test nozzle even in the absence of substantial flow through said specimen.

6. The improvement specified in claim 4 wherein said fluid path bypassing said specimen comprises a fluid path bypassing said specimen and said control means.

* * * * *